A. W. WHITCOMB.
AUTOMATIC COMPENSATING MAGNETIC CLUTCH.
APPLICATION FILED JULY 3, 1911.
1,056,842.
Patented Mar. 18, 1913.
3 SHEETS—SHEET 1.
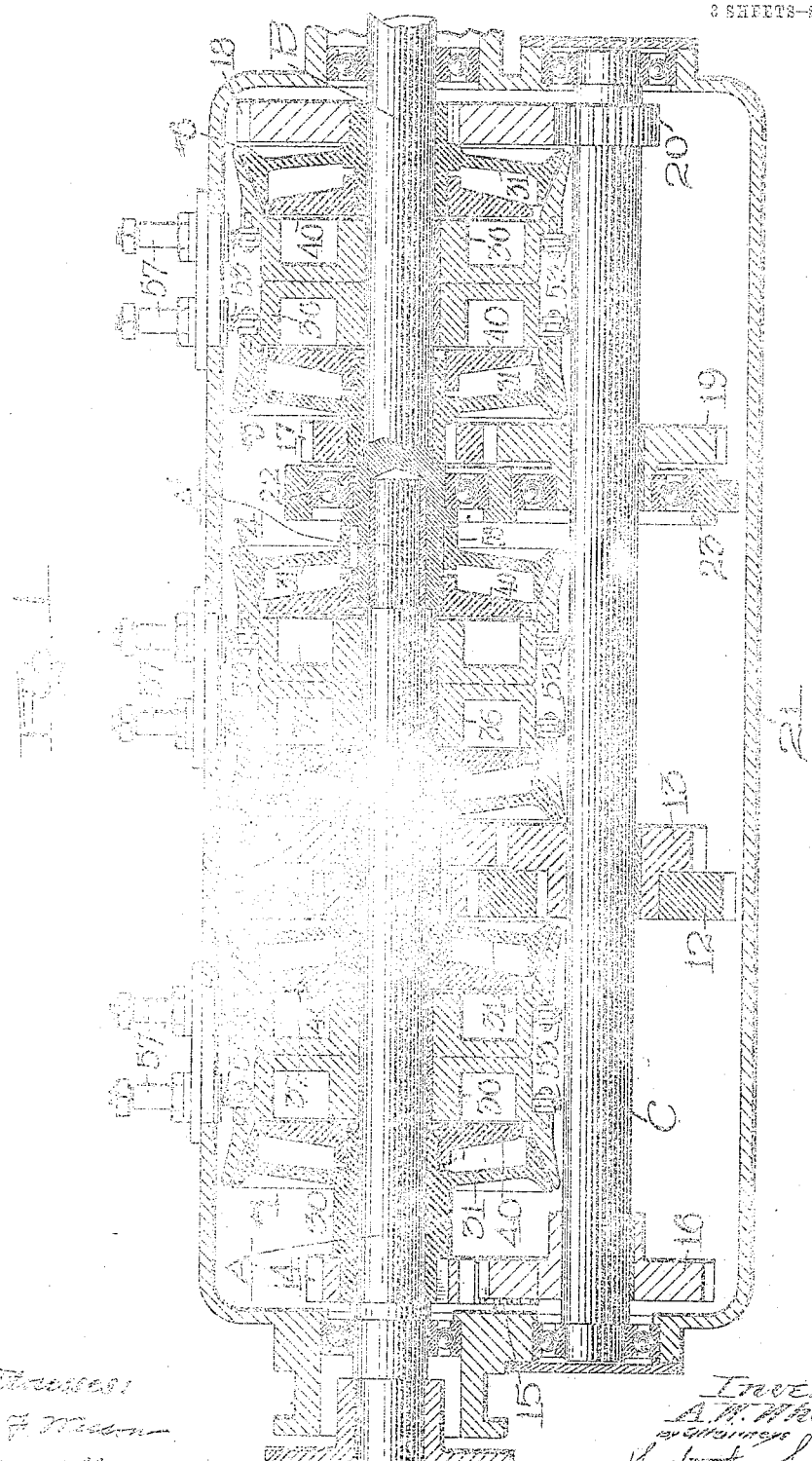

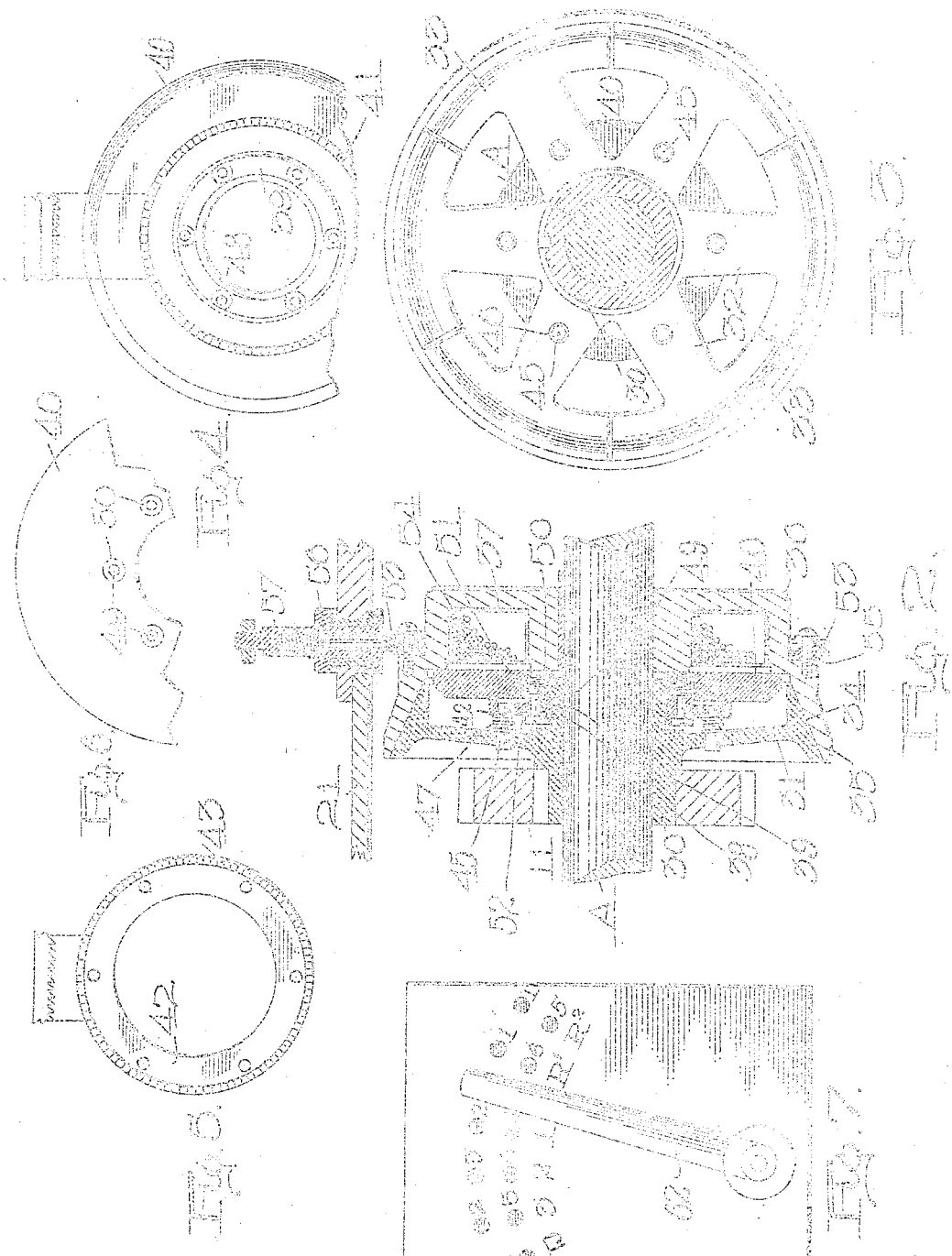

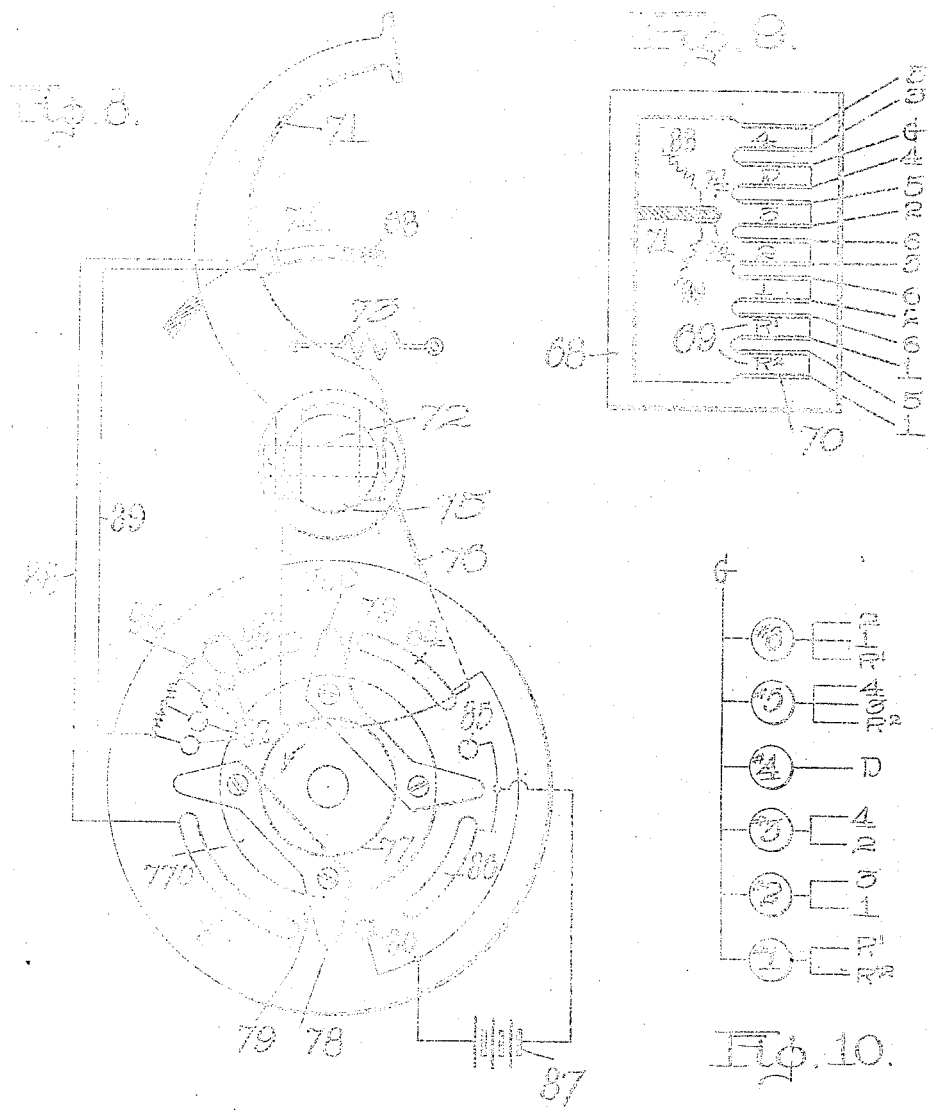

UNITED STATES PATENT OFFICE.

ALONZO W. WHITCOMB, OF WORCESTER, MASSACHUSETTS, ASSIGNOR TO WHITCOMB-BLAISDELL MACHINE TOOL COMPANY, A CORPORATION OF MASSACHUSETTS.

AUTOMATIC COMPENSATING MAGNETIC CLUTCH.

1,056,242.  Specification of Letters Patent.   Patented Mar. 18, 1913.

Application filed July 3, 1911. Serial No. 636,616.

*To all whom it may concern:*

Be it known that I, ALONZO W. WHITCOMB, a citizen of the United States, residing at Worcester, in the county of Worcester and State of Massachusetts, have invented a new and useful Automatic Compensating Magnetic Clutch, of which the following is a specification.

The principal object of this invention is to provide a transmission for transmitting power at different speeds by means of an improved form of automatic compensating magnetic clutch.

Further objects and advantages of the invention will appear hereinafter.

Reference is to be had to the accompanying three sheets of drawings in which,

Figure 1 is a longitudinal central sectional view of a transmission constructed in accordance with this invention. Fig. 2 is a sectional view of an enlarged scale of one of the units of the transmission. Fig. 3 is an elevation of the clutch showing the shaft in section. Fig. 4 is an elevation of the armature of the clutch. Fig. 5 is an elevation of the ratchet ring adapted to engage the armature. Fig. 6 is a face view of part of the armature. Fig. 7 is a plan of a switch board diagrammatically illustrating the electrical connections. Fig. 8 is a side view partially diagrammatic of an operating lever and electrical connection for use in connection with an automobile. Fig. 9 is a plan of the same showing the lever in section, and Fig. 10 is a diagrammatic view showing the connections from the several clutches.

Referring to the drawings and in detail to the first seven figures, a driving shaft A is arranged in alinement with, and telescoped at A' into a driven shaft B. Mounted to run loosely on the driving shaft or to be clutched thereto, as will be explained hereinafter, are two gears 10 and 11 of different sizes, constantly meshing with gears 12 and 13, respectively, keyed to a counter or transmission shaft C. Also arranged on the driving shaft is a loose gear 14 meshing with a reversing gear 15 which in turn drives a gear 16 keyed on the counter-shaft. On the driven shaft B are loosely arranged two gears 17 and 18 of different sizes constantly meshing with gears 19 and 20 fixed on the transmission shaft C. These parts are shown as contained within a casing 21. The shaft B at a point near its end where it engages the shaft A, is supported by a ball bearing 22 arranged in a support which also carries a ball bearing 23 for the shaft C. Other bearings may be arranged, as shown in the ends of the casing to support the shafts A, B and C.

As illustrated, the gear 10 is smaller than any of the other gears on the shafts A and B except the gear 14 which may be either smaller or larger than the gear 10. The gear 14 is comparatively small relatively to the gear 16. The gear 18 is considerably larger than the gear 17 and also larger than the gears 10 and 11. The counter-shaft C is driven only when one of the gears 10, 11 or 14 on the shaft A is fixed to that shaft by one of the clutches hereinafter described.

The relative speeds are obtained as follows:—By locking the gear 10 to the driving shaft and the gear 18 to the driven shaft, the slowest driving speed is obtained between the driving and the driven shafts. By locking the gear 11 to the driving shaft and the gear 18 to the driven shaft, the next fastest speed is obtained. By locking the gear 10 to the driving shaft and the gear 17 to the driven shaft, the next fastest speed is obtained. As the parts are arranged, the next speed is obtained by locking the driving and driven shafts directly together, as hereinafter described, when a direct drive will be obtained. The fastest speed is obtained by locking the gear 11 to the driving shaft and the gear 17 to the driven shaft. Thus, speed can be transmitted from the driving to the driven shafts so that the driven shaft will turn in the same direction as the driving shaft at five different speeds, the fourth relative speed being a direct or synchronous drive between the driving and the driven shaft.

To drive the driven shaft in a reverse direction relatively to the driving shaft, the gear 14 is locked to the driving shaft and the gear 18 is locked to the driven shaft. This will give a relatively slow reverse. To obtain a faster reverse the gear 14 is locked to the driving shaft as above, and the gear 17 is locked to the driven shaft which will give a faster reverse. Thus five speeds, including a direct drive and two reverse speeds, can be obtained.

To effect the locking of the gears in this manner and to provide an arrangement therefor comprising few parts and of such character that the mechanism inside the casing is reduced in size and complication, the following arrangement is employed:—Each of the gears 10, 11, 14, 17 and 18 is keyed or otherwise fixed on a sleeve 30, which sleeves are freely rotatable on the shafts A and B. The construction of the clutch used in connection with the sleeve 30 for the gears 11 is illustrated in the second sheet of the drawings and a description thereof will apply to all the clutches with the exception of details hereinafter mentioned. Each sleeve has an internal friction clutching member 31 which forms part of a clutch. The friction clutching member is shown as comprising a series of spokes 32 radiating from the sleeve 30, each spoke having a segmental member 33 at its outer end. These segmental members 33 together substantially make up a complete circle. Each is provided with a beveled surface 34 on the exterior. The spokes are slightly dished toward the lower or inner edge of the beveled surface and are formed of resilient material. When there is a relative longitudinal motion between the sleeve and the exterior surface of this clutching member in one direction, the beveled surface 34 will be forced outwardly by the toggling action of said spokes against the internal clutching surface of the external clutch member 35. This exterior member 35 is shown as formed on a cylindrical electro-magnet having a chamber 37 therein for the windings or coil. The electro-magnets are keyed to the shafts on which they are arranged.

Each sleeve 30 is provided with an external screw-thread 38 on which is threaded a sleeve 39 provided with an outwardly extending flange 40. This flange 40 forms the armature. The flange 40 is provided on its side opposite the magnet with a circular ratchet 41. Fitted on the hub 39 is a ring 42 having ratchet teeth 43 engaging the ratchet teeth 41. The teeth 41 and 43 are arranged so that the ring 42 can turn in one direction relatively to the armature 40 but not in the other direction.

Extending from the ring 42 are pins 45 which are loosely fitted in perforations or sockets 46 in the spokes 32. Springs 47 surround the pins 45 and normally force the ring 42 toward the armature and keep the ratchet teeth 41 and 43 in engagement. The armature is provided with a series of perforations 48 through which headed bolts 49 are passed. These bolts screw into plungers or plugs 50 which normally project slightly beyond the surface of the armature 40. Springs 51 are arranged around these bolts 49 and tend to press the plugs outwardly so as to force the armature and magnet apart until the heads of the bolts 49 rest on a shoulder formed on the hub 39 and thus limit the movement of the armature away from the magnet. By this arrangement, the armature 40, the hub 39, and spokes 32 and the friction engaging surfaces 33 practically form one part which is movable on the shaft.

When the electro-magnet is energized, the armature is drawn toward the magnet. This brings the clutching member surface 34 against the conical inner surface of the outer clutching member 35. When these surfaces are brought into contact, the pull of the electro-magnet tends to draw the armature and hence the sleeve 30 still farther toward the magnet and this tends to straighten the dished spokes 32. This expands the inner friction surfaces 34 against the friction surface of the outer member 35. As the spokes are resilient, they will yield to this action and thus the inner friction member will be outwardly expanded with a powerful radial thrust against the outer friction member. This continues until the frictional contact with the two surfaces is enough to cause the two members to rotate synchronously so that the final drive is secured by the frictional contact between these surfaces.

When the electro-magnet is released, the spokes 32 assume their normal position and the springs 51 force the clutch members apart until the collar 52 engages the heads of the bolts 49. The plungers 50 bearing on the core of the electro-magnet act as a brake as this action takes place and prevent the armature running ahead. The springs 47 normally keep the ratchets 41 and 43 together when the clutching surfaces are engaged, and when the clutching surfaces are disengaged and the heads of the screws 49 are in contact with the shoulder 52, the springs 51 additionally will help keep the ratchet teeth together. The arrangements described also provide an automatically operating adjusting mechanism for the clutch engaging surfaces.

As the clutching surfaces are engaged, if the armature should contact with the surface of the electro-magnet before there was firm engagement, the friction of the armature on the surface of the electro-magnet will turn the armature relatively to the sleeve 30 and hence will adjust the armature relatively to the clutch member 31 so that a continued pull will be exercised on the armature and a heavier radial thrust given to the clutching member 31. The ratchets will sustain this adjustment. The final operation of these parts will be such that the armature and clutch engaging member 31 will assume just such position as to obtain the proper operation and so that when the armature is pulled toward the electro-magnet and the clutching surfaces properly engaged, the armature will just clear the face of the electro-magnet. After the armature and clutch engaging member 31 have assumed this relative position, they will keep the same by reason of the ratchet mechanism until wear of the friction engaging surfaces calls for a further adjustment, when the armature will be automatically adjusted one or more steps of the ratchet toward the friction engaging member 31.

The coil 54 of the electro-magnet is connected at one terminal with the casing 36 in which it is located, so that that terminal is connected through the shaft either directly with the rest of the circuit or to the ground. The other terminal is connected with a metallic ring 53 which is mounted on the casing 36 and is insulated therefrom by insulating rings 55 held in position by screws or bolts. A spring-pressed brush 56 held in a holder 57 mounted on the main casing 21 is arranged to bear on the ring 53.

The description so far given applies to five clutches numbered 1, 2, 3, 5 and 6, three of them being on the driving shaft and two on the driven shaft. Another clutch, numbered 4, of the same character, is shown for connecting the two shafts A and B. The electro-magnet of this clutch is keyed to the driving shaft A, while the spokes thereof are formed on a hub 59 which is keyed to the shaft B. In this case the screw-threads corresponding with the screw-threads 38 are formed directly on the end of the shaft B and the armature 40 is connected with these screw-threads in the same way, as shown in Fig. 2.

The six conductors which lead from the six brush holders corresponding with the same number of clutches, are brought to a switch board 60 and connected with the terminals thereof in the manner indicated by the numerals 1, 2, 3, 4, 5 and 6, as applied to the contacts on that board. It will be seen that two of the contacts are connected with the clutch numbered 1, two with clutch 2, two with the clutch 3, one with clutch 4, and three each with the clutches 5 and 6. On the switch board is a controlling lever 62 adapted to swing on a pivot which forms a terminal. Thus the controlling lever will complete the circuits by contacting with the terminals thereof which are arranged with respect to the arc over which the lever swings.

As shown, the lever 62 is in its neutral position. On its first movement to the left, clutches 2 and 6 will be engaged. By this arrangement, power will be transmitted from the driving to the driven shaft through gears 10, 13, 20 and 18. This will give speed, depending on the different ratio between the gears 10 and 12 and 11 and 13. As the lever 62 is moved to its next position to the left, clutches 5 and 2 will be engaged. Power will now be transmitted from the driving to the driven shaft through gears 10, 12, 19 and 17, which gears are arranged to give an increased speed.

When the lever 62 is moved to its extreme position to the left, clutches 5 and 3 will be connected and power will be taken from the driving to the driven shaft through gears 11 and 13 and 19 and 17, which gearing is arranged so that the driven shaft will now be rotated at a speed higher than the driving shaft.

Starting again with the lever 62 at its neutral position, as indicated in Fig. 7, and assuming it to be moved on its first step to the right, clutches 1 and 6 will be connected. This will transmit power from the driving to the driven shaft in a reverse direction through gears 14, 15, and 16 and 20 and 18. When the lever 62 is moved to its extreme position to the right, clutches 5 and 1 will be connected and power will be taken from the driving to the driven shaft in a reverse direction to gears 14, 15, 16, 19 and 17, which will give a reverse movement at a higher speed relatively to the first reversing movement. Thus, provision is made for five forward speeds, the fourth forward speed being a direct drive and the fifth speed a faster drive; and for two reverse speeds. The particular arrangement of gearing and parts is merely illustrative of my invention and other forms may be devised having a less number of clutches, if it is not desired to obtain the large number of changes previously indicated. It will be seen, therefore, that five forward (the fourth of which is a clutch drive) and two reverse speeds can be obtained in this way in a comparatively simple manner by the use of a small amount of mechanism in the casing, and that while the clutches are magnetic, the powerful force of conical friction clutching surfaces is utilized for the actual driving. These surfaces are drawn together by magnetic attraction exerted axially in such a way as to have a most powerful effect by reason of the resilient character and dished shape of the spokes 32 and by reason of the automatic adjustment described. It will be seen, also, that it is impossible for the operator to move the controlling arm from a low speed to a high speed or from the reverse to a direct drive without necessitating the passing of the clutching devices through all the intermediate steps, although the rapidity with which this can be done is not restricted.

In the form shown in Figs. 8, 9 and 10, a different, and the preferred controlling device is illustrated. In this form the circuits are connected up, as indicated diagrammatically in Fig. 10, in which the circles represent diagrammatically the several clutch brushes. In this case the controlling device comprises a plate 68 having a number of slots 69. On each side of each slot (except one) are contact members 70, each of which is connected with one of the brush holders or binding posts 57. The numerals in Fig. 9 indicate the particular brush holder or electro-magnet with which each one of these contacts is connected. It will be seen that in the case of the slot second from the upper end in Fig. 9, only one of the conductors is connected with a binding post, as this is the slot for controlling the connection of the two shafts directly. In this case the other side of the slot is connected with the ground to complete the circuit.

For the purpose of controlling the contacts, a lever 71 is provided which, if the mechanism is to be used in an automobile, may be conveniently arranged as a foot lever. This lever is pivotally mounted on a pin 72 and is held normally in its retracted or engaged position by a spring 73. The lever 71 carries contacts 74—74 which engage the contacts at the sides of the slots when the lever is in operative position. By this arrangement, the clutches can be connected up to give any of the speeds in the manner indicated by the connections.

Mounted on the shaft 75 is a segment 76, the end of which is toothed and engages a pinion 77 which controls a switch which is constructed as follows:—Turning with the pinion 77 is a plate 770 which carries two contacts 78 and 780. The extreme motion of the switch is limited by pins 79—79. Contact or pole pieces 80, 81, 82, 83, 84, 85 and 86 are arranged in position to be engaged by the contacts 78 and 780.

87 designates a suitable source of electricity which may be a dynamo or a battery. As the parts are shown, the foot lever is depressed and the contacts are moved clear of the pole pieces. As the foot lever is moved opposite one of the slots and as the same moves into the slot, the contact piece 78 will connect pole pieces 80 and 81 and the contact piece 780 will connect the pole pieces 85 and 83. A line wire 88 is connected with the pole piece 81 and a line wire 89 is connected with the lowest pole piece 82. The pole piece 82 is made in the form of a number of contacts separated by resistances 90. When the circuit is completed in this way, the current will flow from its source 87, pole piece 85, contact 780, pole piece 83, through the resistances to lowest pole piece 82, line wire 89, contact 74 to one clutch, depending on the adjustment of the lever 71, to ground; back through ground, through another clutch, the other contact 74, line wire 88, pole piece 81, contact 78, pole piece 80 to the source. The continued movement of the switch will then move the contacts 780 so that it will connect the pole pieces 84 and 83 and the contact 78 so that it will connect the pole pieces 81 and 86. The current will now flow from its source through pole piece 86, contact 78, pole piece 81, line wire 88, contact 74, one clutch, ground, back through another clutch, the other contact 74, line wire 89, resistances 90, pole piece 83, contact 780, pole piece 84 and back to the source. This will cause a reversal of the current. As the switch continues its movement, the resistances 90 gradually will be cut out and the contact piece 780 will finally rest on the lowest pole piece 82 and the pole piece 84. By this action the current will be first applied in one direction and then reversed, and then the resistances gradually cut out.

When the lever is depressed, the resistances will be gradually cut in, the current reversed and then the circuit opened. The purpose of this reversing and switching arrangement is to reverse the current momentarily each time the clutches are brought to operation so as to energize the magnets, forming part of the clutches, in the opposite direction to get rid of any residual magnetism therein which would tend to cause the clutches to operate. Thus by the arrangements described, the clutches are thrown into operation in proper order.

Many other arrangements may be devised for practising my invention without departing from the scope thereof as expressed in the claims.

Having thus fully described my invention, what I claim is:—

1. In a transmission, the combination of a driving and a driven shaft arranged in alinement, three gears loosely arranged on said driving shaft, a counter-shaft having gears meshed with the three gears on the driving shaft, an intermediate gear being arranged in one of said trains, a driven shaft having two gears thereon, two gears on the counter-shaft meshing therewith, and magnetic clutches arranged in connection with each of the gears on the driving and driven shafts.

2. In a transmission, the combination of a driving and a driven shaft arranged in alinement, three gears loosely arranged on said driving shaft, a counter-shaft having gears meshed with the three gears on the driving shaft, an intermediate gear being arranged in one of said trains, a driven shaft having two gears thereon, two gears on the counter-shaft meshing therewith, and magnetic clutches for locking the driving and driven shafts directly together and for locking each gear on the driving and driven shafts.

3. In a transmission, the combination of a driving and a driven shaft in alinement, a counter-shaft, a plurality of sleeves loose on the driving and driven shafts, a gear fixed with respect to each of said sleeves, gears fixed to the counter-shaft, each meshing with one of the gears on said sleeves, electro-magnets fixed to the driving and driven shafts, each adjacent to one of said sleeves and each having an armature, and means whereby the attraction of any armature toward its magnet will clutch the corresponding sleeve to the magnet and thus fix the gear on said sleeve to the rotating shaft.

4. In a transmission, the combination of a driving and a driven shaft in alinement, a counter-shaft, a plurality of sleeves loose on the driving and driven shafts, a gear fixed with respect to each of said sleeves, gears fixed to the counter-shaft, each meshing with one of the gears on said sleeves, electro-magnets fixed on the driving and driven shafts, each adjacent to one of said sleeves, and each having an armature, means whereby the attraction of any armature toward its magnet will clutch the corresponding sleeve to the magnet, and means for simultaneously energizing a magnet on the driving shaft and one on the driven shaft, whereby the driving shaft will rotate the driven shaft through the counter-shaft.

5. In a transmission, the combination of a driving and a driven shaft, a counter-shaft, a plurality of sleeves loose on the driving and driven shafts, a gear fixed with respect to each of said sleeves, gears fixed to the counter-shaft, each meshing with one of the gears on said sleeves, electro-magnets fixed on the driving and driven shafts, each adjacent to one of said sleeves, each magnet having an armature, a casing in which said gears and magnets are located, a ring fixed thereon but electrically insulated therefrom and connected with one terminal of the winding of the electro-magnet, brushes on said casing engaging said rings, the opposite terminals of all of said electro-magnets being connected electrically with the driving or driven shafts, whereby the connection of any one of said brushes with the driving and driven shafts through a source of electricity will cause the corresponding electro-magnet to be energized, and means whereby the attraction of any armature toward its magnet will clutch the corresponding sleeve to the magnet.

6. In a transmission, the combination of a driving and a driven shaft in alinement, a counter-shaft, a plurality of sleeves loose on the driving and driven shafts, a gear fixed on each of said sleeves, a plurality of gears fixed on the counter-shafts, a gear fixed on each of said sleeves, a plurality of gears fixed on the counter-shafts, each meshing with one of the gears on said sleeves, a series of electro-magnets fixed on the driving and driven shafts, each adjacent to one of said sleeves, each magnet having an armature, means whereby the attraction of any armature toward its magnet will clutch the corresponding sleeve to the magnet, means for simultaneously energizing a magnet on the driving shaft, and a magnet on the driven shaft to cause the driving shaft to rotate the driven shaft through the countershaft, a similar electro-magnet fixed at the end of the driving shaft, and having an armature and a clutch surface, a clutching member fixed at the adjacent end of the driven shaft, and means whereby when the armature is attracted toward the last named electro-magnet, said clutching member will engage said clutch surface and directly connect the driving and driven shafts.

In testimony whereof I have hereunto set my hand, in the presence of two subscribing witnesses.

ALONZO W. WHITCOMB.

Witnesses:
  EVA L. WARREN,
  C. FORREST WESSON.